United States Patent
Simsek-Ege et al.

(10) Patent No.: US 12,346,090 B2
(45) Date of Patent: Jul. 1, 2025

(54) PROCESS CONTROL DEVICE IN MANUFACTURING

(71) Applicant: Micron Technology, Inc., Boise, ID (US)

(72) Inventors: Fatma Arzum Simsek-Ege, Boise, ID (US); Shruthi Kumara Vadivel, Boise, ID (US); Deepti Verma, Boise, ID (US); Anshika Sharma, Boise, ID (US); Lavanya Sriram, Boise, ID (US); Trupti D. Gawai, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 231 days.

(21) Appl. No.: 17/861,374

(22) Filed: Jul. 11, 2022

(65) Prior Publication Data

US 2022/0342386 A1 Oct. 27, 2022

Related U.S. Application Data

(63) Continuation of application No. 16/997,717, filed on Aug. 19, 2020, now Pat. No. 11,385,618.

(51) Int. Cl.
*G05B 19/4093* (2006.01)
*G05B 19/418* (2006.01)

(52) U.S. Cl.
CPC ... *G05B 19/40938* (2013.01); *G05B 19/4187* (2013.01); *G05B 2219/35513* (2013.01)

(58) Field of Classification Search
None
See application file for complete search history.

(56) References Cited

U.S. PATENT DOCUMENTS

| | | |
|---|---|---|
| 5,642,296 A | 6/1997 | Saxena |
| 6,532,680 B2 | 3/2003 | Braasch et al. |
| 7,657,339 B1 | 2/2010 | Retersdorf |
| 8,655,469 B2 | 2/2014 | Choi et al. |
| 10,295,993 B2 | 5/2019 | Choi et al. |

(Continued)

OTHER PUBLICATIONS

R. J. Bunkofske, N. T. Pascoe, J. Z. Colt and M. W. Smit, "Real-time process monitoring," IEEE/SEMI 1996 Advanced Semiconductor Manufacturing Conference and Workshop. ASMC 96 Proceedings, Cambridge, MA, USA, 1996, pp. 382-390 (Year: 1996).*

(Continued)

*Primary Examiner* — Ryan A Jarrett
(74) *Attorney, Agent, or Firm* — Brooks, Cameron & Huebsch, PLLC

(57) ABSTRACT

Methods, devices, and systems related to process control in manufacturing are described. In an example, a method can include receiving data from a first process control device affixed to a first manufacturing tool of a first type, identifying one or more attributes of the data via a second processing resource of a second process control device affixed to a second manufacturing tool of a second type different from the first type, determining one or more settings for the second manufacturing tool via the second processing resource in response to identifying the one or more attributes of the data, and sending a command including the one or more settings to the second manufacturing tool from the second process control device.

15 Claims, 3 Drawing Sheets

(56) References Cited

U.S. PATENT DOCUMENTS

2005/0171626 A1     8/2005   Schwarm
2008/0183312 A1     7/2008   Funk et al.

OTHER PUBLICATIONS

P. G. Borden and R. Burghard, "Progress toward host tool integration of in situ particle monitors," IEEE/SEMI Advanced Semiconductor Manufacturing Conference and Workshop—ASMC '92 Proceedings, Cambridge, MA, USA, 1992, pp. 16-17 (Year: 1992).*

* cited by examiner

PROCESS CONTROL DEVICE IN MANUFACTURING

PRIORITY INFORMATION

This application is a Continuation of U.S. application Ser. No. 16/997,717, filed on Aug. 19, 2020, the contents of which are incorporated herein by reference.

TECHNICAL FIELD

The present disclosure relates generally to a process control device in manufacturing.

BACKGROUND

Products manufactured and/or assembled at different times, on different tools, on different assembly lines, and/or at different facilities can vary. To limit variation among products, tools used in manufacturing can be programmed and/or calibrated. For example, tools performing the same or similar functions can be programmed and/or calibrated the same or similarly. However, product variation may still occur due to environmental factors, varying manufacturers and/or models of tools, varying inputs, or varying sensor outputs, for example.

DETAILED DESCRIPTION

Figure 1:
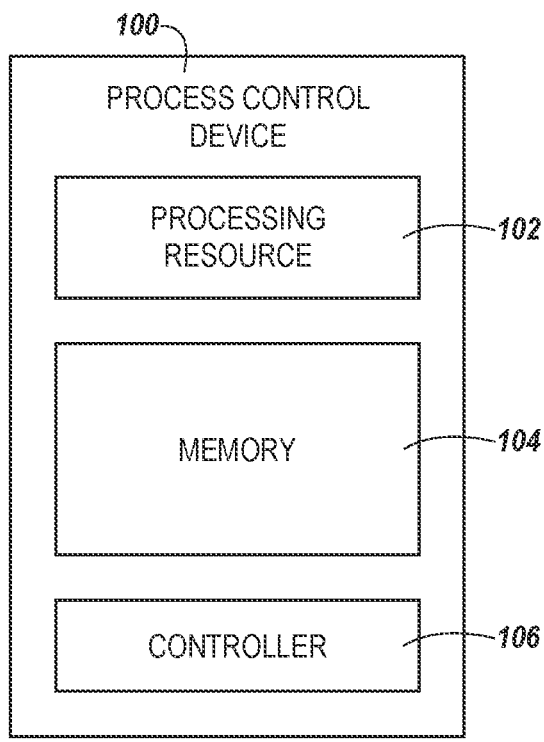
FIG. 1 illustrates an example of a process control device in accordance with a number of embodiments of the present disclosure.

The present disclosure includes methods, apparatuses, and systems related to process control in manufacturing. An example method includes receiving data from a first process control device affixed to a first manufacturing tool of a first type, the first process control device having a configuration of a first sensor, a first processing resource, a first memory, and a first radio configured to communicate using a cellular protocol or wireless local area network (WLAN) protocol, or both, identifying one or more attributes of the data via a second processing resource of a second process control device affixed to a second manufacturing tool of a second type different from the first type, the second process control device having a configuration of a second sensor, a second memory, and a second radio configured to communicate using the cellular protocol or the WLAN protocol, or both, determining one or more settings for the second manufacturing tool via the second processing resource in response to identifying the one or more attributes of the data, and sending a command including the one or more settings to the second manufacturing tool from the second process control device.

A process control device can be a box or a flexible package, for example, and can be made out of one or more materials including a polymer. A process control device can be associated with (e.g., near, on, included in, coupled to, or affixed to) a manufacturing tool. In a number of embodiments, a process control device can include an adhesive portion to enable the process control device to be attached to a manufacturing tool.

The received data can be collected by one or more sensors. The one or more sensors can be, but are not limited to, an acoustic sensor, a pressure sensor, a vibration sensor, a thermal sensor, a humidity sensor, or a chemical sensor. The one or more sensors can be included in and/or affixed to a manufacturing tool. For example, the data can be collected by one or more sensors of the first manufacturing tool and/or the data can be collected by one or more sensors of a process control device associated with the first manufacturing tool.

In some examples, the data can be sent from the first manufacturing tool and/or the process control device associated with the first manufacturing tool to a second manufacturing tool and/or a process control device associated with the second manufacturing tool. The second manufacturing tool and/or the process control device associated with the second manufacturing tool can identify one or more attributes of the data, determine one or more settings for the second manufacturing tool to replicate the one or more attributes, and execute a command to initiate the one or more settings.

In a number of embodiments, the first manufacturing tool can identify the one or more attributes of the data and determine one or more settings for the second manufacturing tool based on the identified one or more attributes. In some examples, the first manufacturing tool can send a command including the one or more settings to the second manufacturing tool to enable the second manufacturing tool to replicate the output of the first manufacturing tool.

As used herein, "a number of" something can refer to one or more of such things. For example, a number of process control devices can refer to one or more process control devices. A "plurality" of something intends two or more.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1, and a similar element may be referenced as 202 in FIG. 2. In some instances, a plurality of similar, but functionally and/or structurally distinguishable, elements or components in the same figure or in different figures may be referenced sequentially with the same element number (e.g., 300-1, 300-2, 300-3, 300-4, 300-5, and 300-6 in FIG. 3). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a process control device 100 in accordance with a number of embodiments of the present disclosure. The process control device 100 can be a box or a flexible package. In some examples, the process control device 100 can be made out of one or more materials including a polymer material. The process control device 100 can be on and/or attached to a manufacturing tool. In a number of embodiments, the process control device 100 can include an adhesive portion (e.g., adhesive portion 226 in FIG. 2) to enable the process control device 100 to be attached to a manufacturing tool.

Process control device 100 can include a processing resource 102, a memory 104, and a controller 106. Controller 106 can include hardware, firmware, and/or software for creating and executing commands. Controller 106 can be communicatively coupled to processing resource 102 and memory 104. Memory 104 can be any type of storage medium that can be accessed by processing resource 102 to perform various examples of the present disclosure. For example, memory 104 can be a non-transitory computer readable medium having computer readable instructions (e.g., computer program instructions) stored thereon that are executable by processing resource 102 for process control in manufacturing in accordance with the present disclosure. For instance, processing resource 102 can execute the executable instructions stored in memory 104 to receive data from a first manufacturing tool, identify one or more attributes of the data, determine one or more settings for a second manufacturing tool in response to identifying the one or more attributes of the data, and send a command including the one or more settings to the second manufacturing tool.

Figure 2:
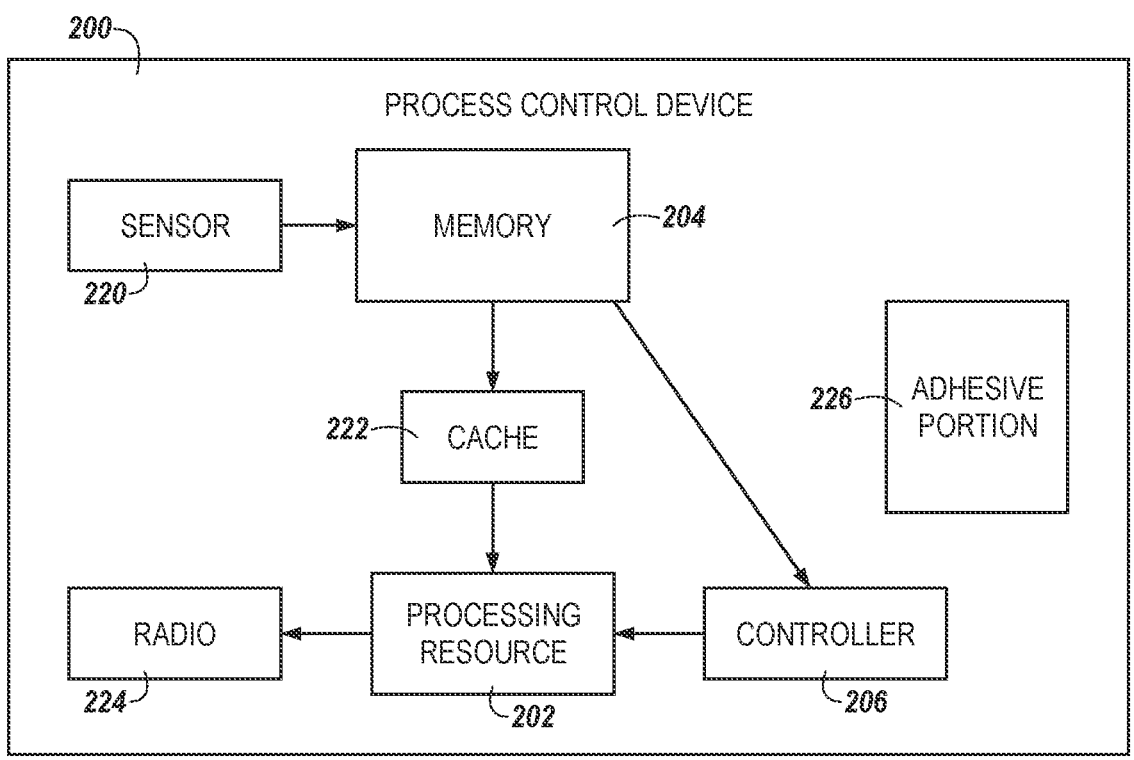
FIG. 2 illustrates an example of a process control device in accordance with a number of embodiments of the present disclosure.
Figure 3:
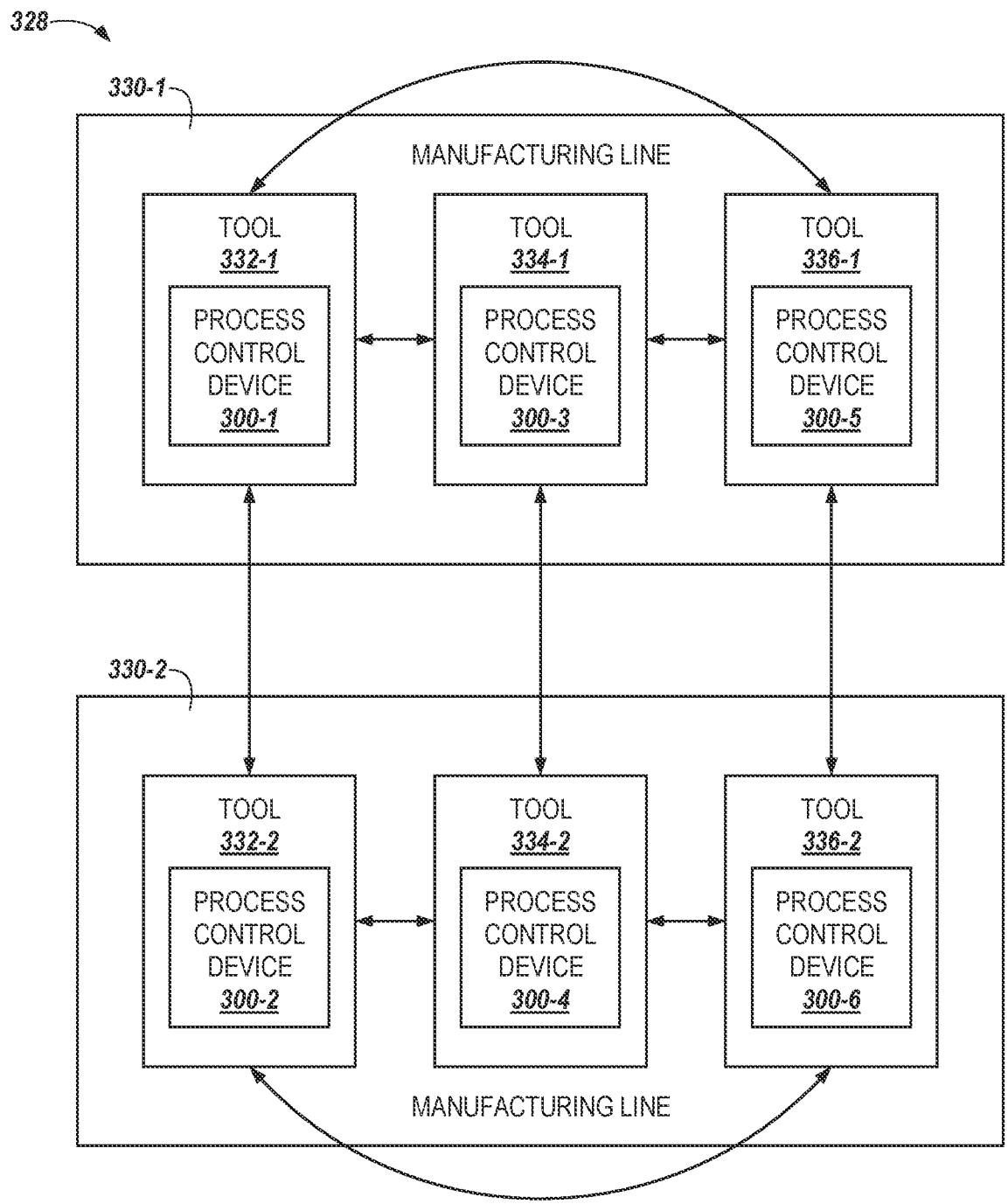
FIG. 3 illustrates an example of a system including a number of process control devices in accordance with a number of embodiments of the present disclosure.

The data can be collected by one or more sensors (e.g., sensor 220 in FIG. 2) included in or coupled to the first manufacturing tool (e.g., first manufacturing tool 332-1 in FIG. 3). The one or more sensors can be integrated into the first manufacturing tool and/or included in process control device 100 associated with the first manufacturing tool. The one or more sensors can include, for example, an acoustic sensor, a pressure sensor, a vibration sensor, a thermal sensor, a humidity sensor, a chemical sensor, or a particle sensor.

The data can be sent (e.g., transmitted) from the first manufacturing tool and/or the process control device 100 associated with the first manufacturing tool to the second manufacturing tool and/or the process control device 100 associated with the second manufacturing tool. In some examples, the data can be sent from a different computing device, for example, a server or a cloud computing system. The data can be received via a radio (e.g., radio 224 in FIG. 2). The process control device can communicate with other process control devices, manufacturing tools, or computing devices, for example, using a radio configured to communicate using a cellular protocol and/or a WLAN protocol.

The one or more attributes of the data identified via the processing resource 102 can include output attributes. Output attributes can be key features or characteristics of an output (e.g., a product, a yield, etc.) from the first manufacturing tool used to identify whether an output has been successfully reproduced (e.g., replicated). For example, output attributes, can be, but are not limited to, various measurements (e.g., diameters, thicknesses, lengths, tolerances, surface finish, tristimulus values, etc.) of an output. A user may input (e.g., enter) the desired output attributes into the first manufacturing tool and/or the process control device 100. In some examples, specifications of the output can be inputted into the process control device 100 and the process control device 100 can derive the output attributes from the specifications.

The one or more attributes of the data can also include input attributes. The input attributes can be derived from the output attributes. For example, input attributes can be elements or components that contribute to or are critical to reproducing a particular output from the first manufacturing tool. Input attributes can be, but are not limited to, for example, a chemical mixture, a force, a pressure, a speed, a humidity, or a temperature.

In a number of embodiments, data can be collected from a manufacturing tool, for example, a stamping press. The speed of the press and the number of times a mold is used before being replaced can be identified as input attributes crucial to reproducing a particular door of a vehicle, for example. An output attribute used in identifying that the door has been successfully reproduced can be, for example, a thickness measurement of the door.

Additional data can be collected. For example, a temperature of the press could have been detected over a period of time. However, not all data may be identified as one or more attributes important to replicate an output or important in identifying a successful reproduction of an output. For example, the temperature of the press may not be identified as one of the one or more attributes because the temperature change of the press did not significantly change the thickness of the door or other key output attributes.

Process control device 100 can determine one or more settings (e.g., inputs, controls, etc.) for a second manufacturing tool via the processing resource 102 in response to identifying the one or more attributes of the data. Settings can include, but are not limited to, temperature, speed, force, humidity, and pressure.

Each manufacturing tool can have different controls. For example, the controller of the first stamping press can change a force of the stamp while the controller of the second stamping press can change an acceleration of the stamp. Even though the second stamping press does not have an input for force, the process control device 100 can determine the acceleration needed for the second stamping press to replicate the force using the one or more attributes of the data and/or data from the second stamping press. For example, the acceleration of the second stamping press can be determined based on the force of the first stamping press, the desired thickness of the door, and the weight of the stamp of the second stamping press. In a number of embodiments, processing device 100 can receive and/or store the controls and/or data of one or more manufacturing tools for determining one or more settings for a particular manufacturing tool. The controls and/or data can be stored in memory 104, for example.

The first manufacturing tool and the second manufacturing tool can include different parts. For example, a stamp of the first manufacturing tool can weigh more than a stamp of the second manufacturing tool. Even though the second stamping press does not have the same stamp weight as the first stamping press, the process control device 100 can determine the settings needed for the second stamping press to replicate the force of the first stamping press using the one or more attributes of the data. To reproduce the force of the first stamping press, the process control device 100 can determine, for example, that the second stamping press will require a higher acceleration setting for the stamp than an acceleration setting for the first stamping press.

Process control device 100 can send a command including the one or more settings to the second manufacturing tool via controller 106. The command can be sent from the controller 106 of the process control device 100 associated with the first manufacturing tool to the second manufacturing tool and/or the process control device 100 associated with the second manufacturing tool. In some examples, the command can be sent from a different computing device, for example, a server or a cloud computing system. The command can be sent via a radio.

The command can be received by the second manufacturing tool and/or the process control device 100 associated with the second manufacturing tool. The second manufacturing tool can execute the command and set the controls to the one or more settings included in the command in response to receiving the command.

The second manufacturing tool can replicate the output of the first manufacturing tool in response to executing the command at the second manufacturing tool. If the one or more settings executed are correct, sensor data from the second manufacturing tool and/or the process control device 100 associated with the second manufacturing tool can include output attributes that are the same, similar to, or within a threshold of the output attributes of the first manufacturing tool.

FIG. 2 illustrates an example of a process control device 200 in accordance with a number of embodiments of the present disclosure. Process control device 200 can correspond to process control device 100 in FIG. 1 and can include a processing resource 202, a memory 204, and a controller 206. The processing resource 202, the memory 204, and the controller 206 can correspond to processing resource 102, memory 104, and controller 106, respectively in FIG. 1. As illustrated in FIG. 2, process control device 200 can further include a sensor 220, a cache 222, a radio 224, and an adhesive portion 226.

As previously described, a process control device 200 can be near, on, included in, coupled to, or affixed to a manufacturing tool. The adhesive portion 226 can enable the process control device 200 to be affixed to the manufacturing tool. A glue, an epoxy, and/or a polyurethane, for example, can be included in the adhesive portion 226.

In some examples, sensor 220 can be included in the process control device 200 and collect data from the manufacturing tool. The data collected by the sensor 220 can be sent from the first manufacturing tool and/or the process control device 200 associated with the first manufacturing tool to the second manufacturing tool and/or the process control device 200 associated with the second manufacturing tool. In some examples, the data can be sent from a different computing device, for example, a server or a cloud computing system.

The data can be received via the radio 224. As previously described, the process control device 200 can communicate with other process control devices, manufacturing tools, or computing devices using radio 224 configured to communicate using a cellular protocol and/or a WLAN protocol, for example. In some examples, the process control device 200 can communicate with other process control devices, manufacturing tools, or computing devices using the radio 224 on a fifth generation (5G) network.

In a number of embodiments, the process control device 200 of the second manufacturing tool can identify one or more attributes of the data. The one or more attributes of the data identified via the processing resource 202 can include output attributes and input attributes, as previously described.

In a number of embodiments, data can be collected from a manufacturing tool, for example, an extruder. The temperature and output rate of the extruder can be identified as input attributes crucial to reproducing a particular filament, for example. An output attribute used in identifying that the filament has been successfully reproduced can be, for example, a diameter of the filament.

Additional data can be collected. For example, a vibration of the extruder could have been detected over a period of time. However, not all data may be identified as one or more attributes important to replicate an output or important in identifying a successful reproduction of an output. For example, the vibration of the extruder may not be identified as one of the one or more attributes because any changes to vibration of the extruder did not significantly change the diameter of the filament or other key output attributes.

Process control device 200 can determine one or more settings for a second manufacturing tool via processing resource 202 in response to identifying the one or more attributes of the data, as previously described in FIG. 1. The processing resource 202 can be used to perform artificial intelligence (AI) operations to identify the one or more attributes of the data and/or determine the one or more settings. The processing resource 202 can include components configured to enable the process control device 200 to perform AI operations. In some examples, AI operations may include machine learning or neural network operations, which may include training operations or inference operations, or both. In a number of embodiments, process control device 200 can include cache 222 to accelerate AI operations by providing data to the processing resource 202 faster.

Each manufacturing tool can have different units for their controls. In a number of embodiments, processing control device 200 can receive and/or store the controls and/or data of one or more manufacturing tools for determining one or more settings for a particular manufacturing tool. The process control device 200 can store and/or receive data including the second manufacturing tools units for determining one or more settings for the second manufacturing tool. For example, the controller of the first extruder can have its output rate setting in pounds per second while the controller of the second extruder can have its output rate setting in kilograms per second. Even though the second extruder does not have the same units as the first extruder, the process control device 200 can determine the output rate setting of the second extruder by converting the output rate from pounds per second to kilograms per second.

The first manufacturing tool and the second manufacturing tool can vary in age, in type of use, and/or in amount of use. For example, the first extruder can be older than the second extruder. As such, the first extruder may not have a humidity sensor or the humidity sensor may no longer be providing accurate humidity measurements. As previously described, the process control device 200 can include sensor 220, for example, a humidity sensor. The process control device 200 can collect humidity data from the first extruder using its humidity sensor 220 instead of using data from the humidity sensor of the first extruder that may be inaccurate for determining a humidity setting for the second extruder.

As previously described in FIG. 1, process control device 200 can send a command including the one or more settings to the second manufacturing tool via radio 224. The command can be received by the second manufacturing tool and the second manufacturing tool can set the controls to the one or more settings included in the command.

FIG. 3 illustrates an example of a system 328 including a number of process control devices 300-1, 300-2, 300-3, 300-4, 300-5, and 300-6 in accordance with a number of embodiments of the present disclosure. The system 328 can further include a number of manufacturing lines 330-1 and 330-2. Manufacturing line 330-1 can include a number of manufacturing tools 332-1, 334-1, and 336-1 and manufacturing line 330-2 can include a number of manufacturing tools 332-2, 334-2, and 336-2. Each of the manufacturing tools 332-1, 332-2, 334-1, 334-2, 336-1, and 336-2 can include a process control device of the number of process control devices 300-1, . . . , 300-6.

A factory can include both manufacturing line 330-1 and manufacturing line 330-2 or manufacturing line 330-1 and manufacturing line 330-2 can be located in different factories. In some examples, manufacturing line 330-1 and manufacturing line 330-2 can be located in the same factory and can be coupled together allowing product to be moved between manufacturing line 330-1 and manufacturing line 330-2.

In a number of embodiments, manufacturing line 330-1 can be identical to manufacturing line 330-2 or manufacturing line 330-2 can contain the same type of tool, the same model of tool, or a tool that performs a similar function as a tool included in manufacturing line 330-1. Tool 332-1 and tool 332-2 can be a first type of tool that performs a first function, tool 334-1 and tool 334-2 can be a second type of tool that performs a second function, and tool 336-1 and tool 336-2 can be a third type of tool that performs a third function in a manufacturing process. For example, tool 332-1 and tool 332-2 can be a masking tool, tool 334-1 and tool 334-2 can be an etching tool, and tool 336-1 and tool 336-2 can be a cleaning tool of a semiconductor manufacturing process.

The manufacturing tools 332-1, 332-2, 334-1, 334-2, 336-1, and 336-2 can communicate with each other via the process control devices 300-1, . . . , 300-6. The process control devices 300-1, . . . , 300-6 can send and/or receive data and/or commands. For example, process control device 300-1 can receive data from manufacturing tool 332-1, identify one or more attributes of the data, determine one or more settings for manufacturing tool 332-2 in response to identifying the one or more attributes of the data, and send a command including the one or more settings to the process control device 300-2 to execute on the manufacturing tool 332-2.

In a number of embodiments, process control device 300-2 can receive data from manufacturing tool 332-1, identify one or more attributes of the data, determine one or more settings for manufacturing tool 332-2 in response to identifying the one or more attributes of the data, and send a command including the one or more settings to manufacturing tool 332-2 to execute.

Manufacturing tool 300-2 can replicate the output of manufacturing tool 300-1 in response to executing the command at manufacturing tool 300-2. If the one or more settings executed are correct, sensor data from manufacturing tool 300-2 can include the one or more attributes of the data. This verifies that the output from manufacturing tool 300-2 is the same as, similar to, or within a threshold of the output of manufacturing tool 300-1 and manufacturing tool 300-2 has successfully replicated the output of manufacturing tool 300-1.

In a number of embodiments, the process control devices 300-1, . . . , 300-6 can be used for calibration. For example, manufacturing tool 332-2 can be a new tool. Process control device 300-1 and/or process control device 300-2 can send a command to manufacturing tool 332-2 including one or more settings for manufacturing tool 332-2 to replicate the output of manufacturing tool 332-1.

In some examples, one of the number of process control devices 300-1, . . . , 300-6 can send a command to perform preventative maintenance, stop an operation, and/or bypass one or more of the number of manufacturing tools 332-1, 332-2, 334-1, 334-2, 336-1, and 336-2. For example, a first product can be sent from manufacturing tool 332-1 to manufacturing tool 334-1 and a second product can be sent from manufacturing tool 332-1 to manufacturing tool 334-2 bypassing manufacturing tool 334-1 in response to a command from one of the number of process control devices 300-1, . . . , 300-6.

The command can be from process control device 300-5, for example. Process control device 300-5 can include a particle counter. The process control device 300-5 can determine that the manufacturing tool 334-1 is creating an excess number of particles and needs to be cleaned. In response, the process control device 300-5 can send a command to process control device 300-1 and/or process control device 300-3 to bypass manufacturing tool 334-1 and send product to manufacturing tool 334-2.

Figure 4:
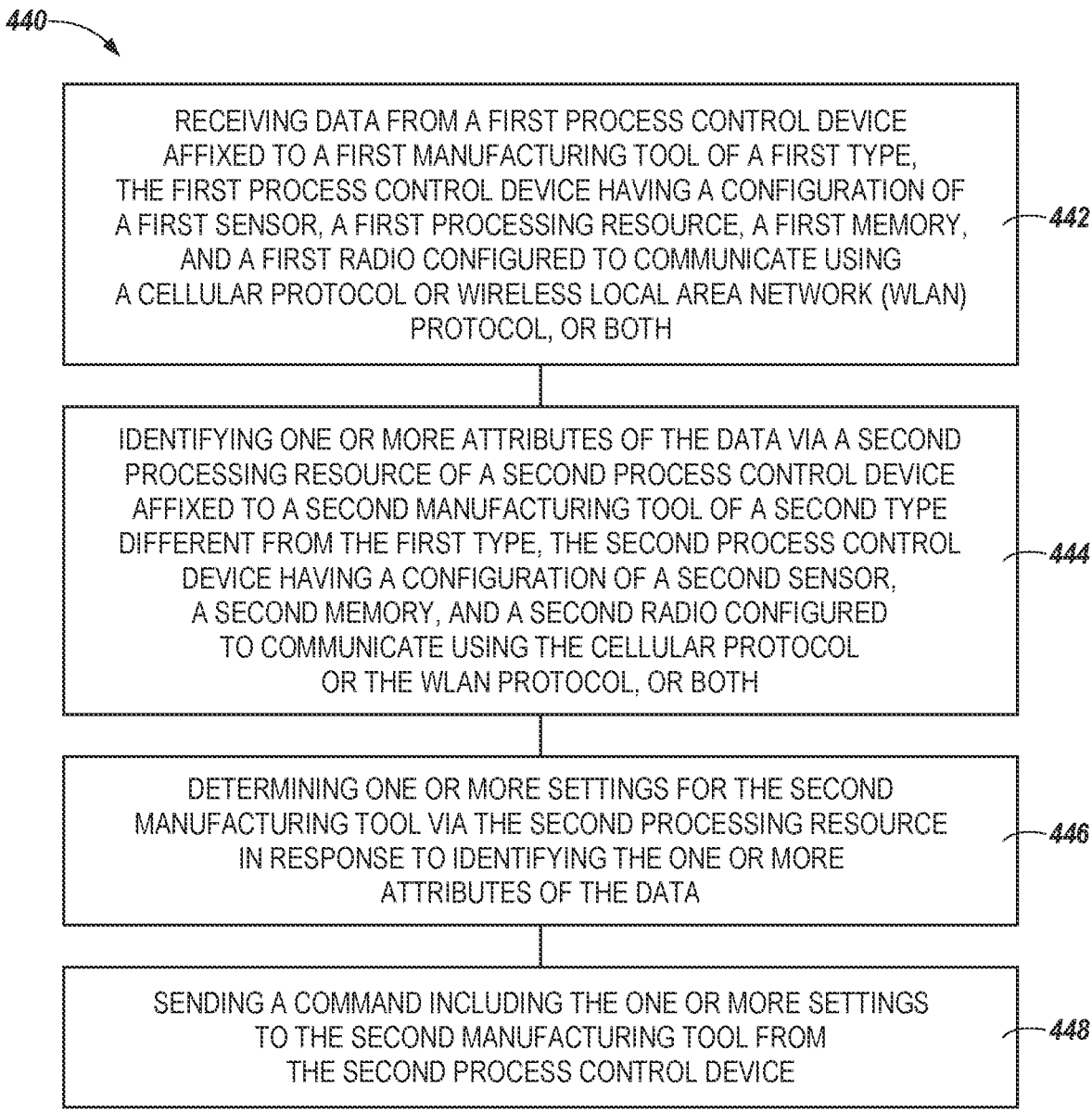
FIG. 4 is a flow diagram of a method for process control in manufacturing in accordance with a number of embodiments of the present disclosure.

FIG. 4 is a flow diagram of a method 440 for process control in manufacturing in accordance with a number of embodiments of the present disclosure. At block 442, the method 440 can include receiving data from a first process control device affixed to a first manufacturing tool of a first type, the first process control device having a configuration of a first sensor, a first processing resource, a first memory, and a first radio configured to communicate using a cellular protocol or WLAN protocol, or both.

The data can be collected by one or more sensors near, included in, or affixed to the first manufacturing tool. The one or more sensors can be integrated into the first manufacturing tool and/or included in a process control device associated with the first manufacturing tool. In some examples, the data can be collected by the first sensor.

At block 444, the method 440 can include identifying one or more attributes of the data via a second processing resource of a second process control device affixed to a second manufacturing tool of a second type different from the first type, the second process control device having a configuration of a second sensor, a second memory, and a second radio configured to communicate using the cellular protocol or the WLAN protocol, or both. The one or more attributes of the data can include output attributes. Output attributes can be key features or characteristics of an output from the first manufacturing tool used to identify whether an output has been successfully reproduced. For example, output attributes, can be, but are not limited to, various measurements of an output. A user may enter the output attributes into a manufacturing tool and/or a process control device. In some examples, specifications of the output can be entered into a process control device and the process control device can derive the output attributes from the specifications.

The one or more attributes of the data can also include input attributes. The input attributes can be derived from the output attributes. For example, input attributes can be elements or components that contribute to or are critical to reproducing an output from the first manufacturing tool.

At block 446, the method 440 can include determining one or more settings for the second manufacturing tool via the second processing resource in response to identifying the one or more attributes of the data. Each manufacturing tool can have different controls and/or different parts. In a number of embodiments, a processing device can receive and/or store the controls and/or data of one or more manufacturing tools for determining one or more settings for a particular manufacturing tool.

At block 448, the method 440 can include sending a command including the one or more settings to the second manufacturing tool from the second process control device. The command can be sent via a radio. A process control device can communicate with other process control devices, manufacturing tools, or computing devices, for example, using a radio configured to communicate using a cellular protocol and/or a WLAN protocol.

The command can be received by the second manufacturing tool. The second manufacturing tool can execute the command and set the controls to the one or more settings included in the command in response to receiving the command.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and one other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, data, including a detected number of particles, at a process control device affixed to a first manufacturing tool in a manufacturing line;
   determining a second manufacturing tool is creating an excess number of particles at least partially based on the detected number of particles;
   transmitting a command from the process control device at least partially based on the data; and
   performing at least one of: preventative maintenance on the second manufacturing tool, stopping an operation at the second manufacturing tool, or bypassing the second manufacturing tool in the manufacturing line in response to receiving the command.

2. The method of claim 1, further comprising detecting the number of particles via a particle counter.

3. The method of claim 1, further comprising transmitting the command to clean the second manufacturing tool in response to determining the second manufacturing tool is creating the excess number of particles.

4. The method of claim 1, further comprising transmitting the command to bypass the second manufacturing tool in response to determining the second manufacturing tool is creating the excess number of particles.

5. The method of claim 1, further comprising transmitting the command to stop the operation at the second manufacturing tool in response to determining the second manufacturing tool is creating the excess number of particles.

6. The method of claim 1, further comprising receiving the data from at least one of: acoustic sensor, a pressure sensor, a vibration sensor, a thermal sensor, a humidity sensor, or a chemical sensor.

7. The method of claim 1, further comprising receiving the data from a sensor integrated into the first manufacturing tool.

8. An apparatus, comprising:
   a particle counter configured to detect a number of particles;
   a memory; and
   a first processing resource affixed to a first manufacturing tool in a manufacturing line and configured to:
   receive the detected number of particles;
   determine a second manufacturing tool in the manufacturing line is creating an excess number of particles based on the detected number of particles; and
   transmit a command to a second processing resource affixed to the second manufacturing tool in response to determining the second manufacturing tool is creating the excess number of particles,
   wherein the second processing resource is configured to:
   perform at least one of: preventative maintenance on the second manufacturing tool, stop an operation at the second manufacturing tool, or bypass the second manufacturing tool in the manufacturing line in response to receiving the command.

9. The apparatus of claim 8, wherein the apparatus includes a polymer material.

10. The apparatus of claim 8, wherein the apparatus includes an adhesive portion.

11. The apparatus of claim 10, wherein the apparatus adheres to the first manufacturing tool via the adhesive portion.

12. A system, comprising:
   a first process control device affixed to a first manufacturing tool, wherein the first process control device is configured to:
   receive data, including a detected number of particles, from one or more sensors;
   determine a second manufacturing tool is creating an excess number of particles at least partially based on the detected number of particles; and
   send a command to a second process control device in response to the received data; and
   the second process control device affixed to the second manufacturing tool, wherein the second process control device is configured to:
   receive the command from the first process control device; and
   stop an operation at the second manufacturing tool in response to receiving the command.

13. The system of claim 12, wherein the first process control device is a flexible package.

14. The system of claim 12, wherein the first manufacturing tool is of a first type.

15. The system of claim 14, wherein the second manufacturing tool is of a second type different from the first type.

* * * * *